July 13, 1965     W. S. SAUNDERS     3,194,512
JET-WING AIRCRAFT
Filed Sept. 6, 1961     3 Sheets-Sheet 1
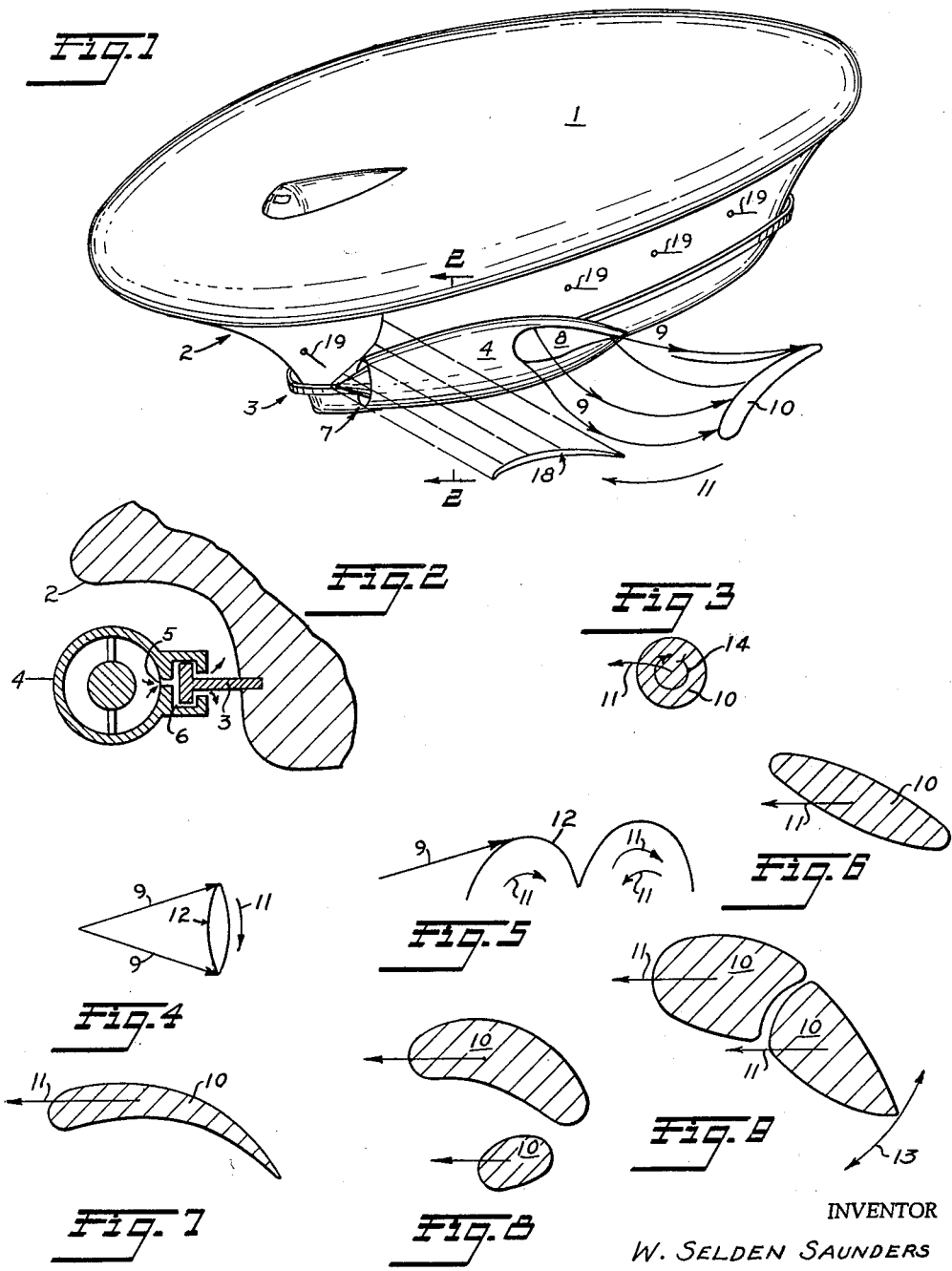
INVENTOR
W. SELDEN SAUNDERS
BY
ATTORNEY July 13, 1965 W. S. SAUNDERS 3,194,512
JET-WING AIRCRAFT
Filed Sept. 6, 1961 3 Sheets-Sheet 2
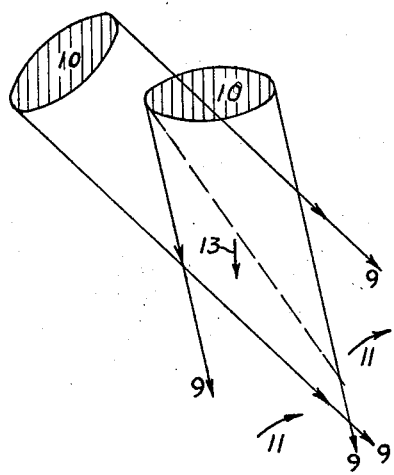
Fig.10
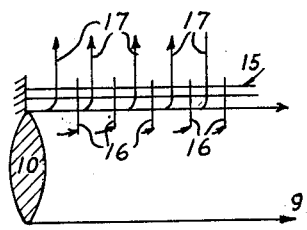
Fig.11
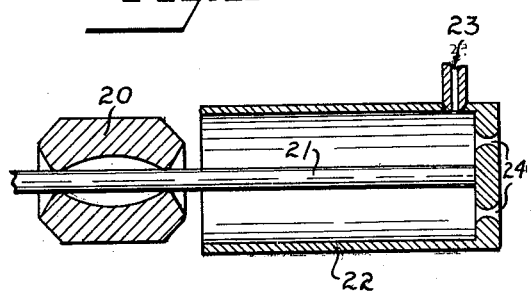
Fig.12
Fig.13
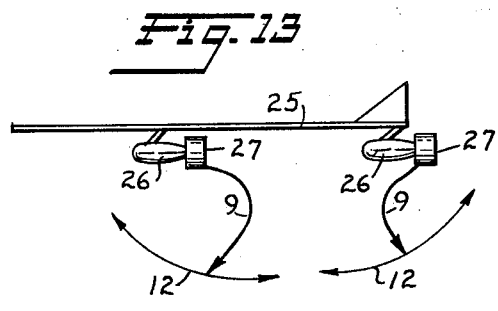
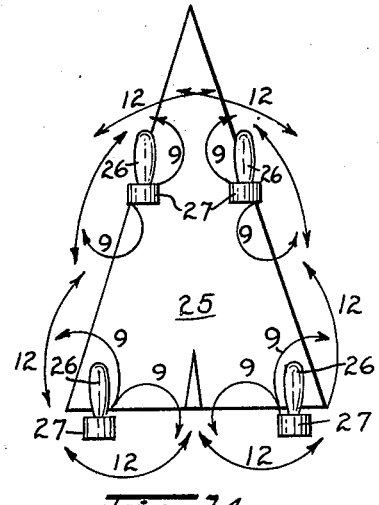
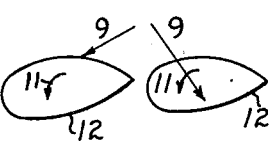
Fig.15
Fig.14
INVENTOR
W. SELDEN SAUNDERS July 13, 1965         W. S. SAUNDERS         3,194,512
                      JET-WING AIRCRAFT
Filed Sept. 6, 1961                    3 Sheets-Sheet 3
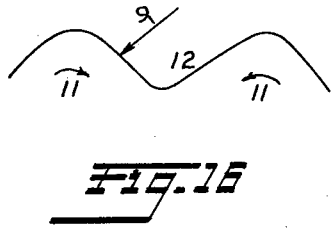
Fig.16
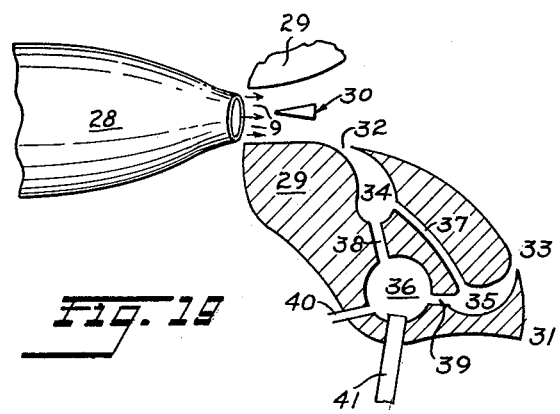
Fig.19
Fig.17
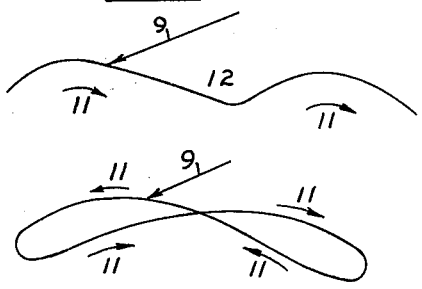
Fig.18
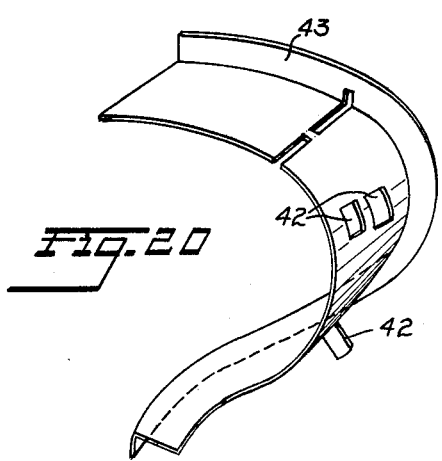
Fig.20
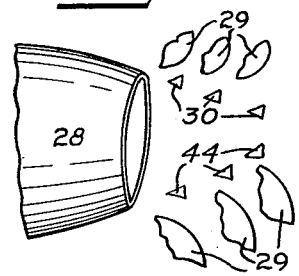
Fig.21
INVENTOR
W. SELDEN SAUNDERS United States Patent Office 3,194,512
Patented July 13, 1965

3,194,512
JET-WING AIRCRAFT
Walter Selden Saunders, 8014 Bradley Blvd.,
Bethesda, Md.
Filed Sept. 6, 1961, Ser. No. 136,293
2 Claims. (Cl. 244—23)

This invention relates to jet wing aircraft. It consists in a jet wing or shock wing sweeping from what is substantially a point source in combination with an aircraft body to yield an improved aerodynamic vehicle.

FIG. 1 is a perspective view of a disk shaped aircraft. FIG. 2 is a cross-section through the side of FIG. 1. FIGS. 3, 6, 7, 8 and 9 are cross-sections through the various jet wings. FIGS. 4, 5, 15, 16, 17 and 18 are diagrams of sweep paths. FIG. 10 is a diagram of crossed jet wings. FIG. 11 is a diagram of a jet wing interacting with deflecting vanes on a cable. FIG. 12 is a cross-section through a free piston engine. FIG. 13 is a side plan view of a delta wing aircraft. FIG. 14 is the bottom plan view of this aircraft with the action of the jet wings shown diagrammatically. FIG. 19 is a cross-section through a Coanda trough. FIG. 20 is a perspective view of a section of a Coanda trough. FIG. 21 is a cross-section of a nozzle with a series of Coanda troughs and splitters.

FIG. 1 shows a generally disk shaped aircraft 1. The outside periphery of the disk contains a concave surface whose cross-section is shown in FIG. 2 as 2. Inside this surface is a rail 3 which runs around the entire disk. This rail is similar to that of a monorail train. On this rail a ramjet engine 4 is held captive and constrained to fly around the disk. However, instead of conventional lubrication for the bearing surfaces between the engine and the rail I substitute an air bearing supplied through a hole in the engine 5 of FIG. 2 and a cushion formed by the shock wave entering from the front 6. Essentially the ramjet flies along the rail and does not slide along it in the conventional sense.

The ramjet engine has an intake 7 at its front end and an exhaust orifice 8 at its rear, FIG. 1. The exhaust orifice is so shaped that a portion of the exhaust thrust is used to propel the ramjet while a portion of it is used to accelerate it toward the center of the disk thus taking most of the strain due to centrifugal force off of the rail. The exhaust shown by arrow 9 is also pointed downward so that it assumes a more or less airfoil cross-section as shown by 10. This airfoil shape is swept along with the ramjet engine in direction of arrow 11 and since it behaves very similarly to a propeller blade moving in the same direction it therefore pumps the surrounding air under the aircraft 1 thus sustaining it.

The initial shape of the exhaust cross-section may be chosen to obtain efficient airfoil action of the jet wing. An initially round jet wing may be used FIG. 3 provided the sweep path is correct. This works for example in the case of conical sweeps 12 of FIG. 4 and FIG. 5 where the apex of the cone points in the opposite direction of the induced air flow. The effect is used in the device of FIG. 1.

It is also possible to use an ellipse, FIG. 6, of varying slenderness ratios and at various angles of attack, or a cambered airfoil section FIG. 7. Such an airfoil shape may also be slotted or have a nozzle formed in portions of it to provide a better effective trailing edge FIG. 8. Such arrangements may be in cascade.

In the course of the sweep one portion of the jet wing may be forced by suitable means to follow a different sweep pattern than the rest of the jet wing. FIG. 9 shows the cross-section of a jet wing that has a flapping trailing edge of deforming portion whose relative oscillatory motion is indicated by the arrow 13. This motion can be used to exploit non-steady inertial effects. Of course this technique may be applied to non-closed body jet wing cross-sections. For example the nozzle width of FIG. 8 may vary during the sweep.

The jet wing may be given an initial rotation, for example in direction of arrow 14 of FIG. 3, by some means to aid its pumping efficiency and help direct its sweep.

Two or more jet wings may be crossed or made to interfere so as to provide efficient pumping action FIG. 10. This interfering wing may be wholly or partially submerged in the other jet wing and have a different thrust density.

A jet wing may be used in conjunction with a rigid wing or a solid flexible wing. FIG. 11 shows a flexible cable 15 supported by the flow of the jet wing 9 and containing small rigid vanes 16 which deflect a portion of the jet wing flow of the jet wing into a conventional jet flap 17 for that jet wing.

The thrust intensity of the jet wing may vary with time. Thus the effective sweep direction may have a component parallel with the source.

The shock wave springing from the jet engine 4 of FIG. 1 is also used. This shock wave reflects off the surface 2 of the aircraft thus helping to sustain it. It also forms an airfoil section 18 which pumps air in a similar way to a propeller blade thus sustaining the aircraft.

Proper design of the shape of the ramjet engine and the reflecting surface will give efficient operation for various aircraft. Portions of the reflecting surface 2 may be moved by suitable means to provide maneuvering control.

The shock wing may also be made to interact with the jet wing to give more efficient pumping action. For example the two wings may be suitably positioned in such a way as to control the separation point for the airflow over the jet wing.

Nuclear fuel may be carried inside the engine in the case of a nuclear ramjet. Conventional fuel for the jet engine may be stored inside the aircraft proper and simply sprayed from nozzles 19 into the path of the jet as it approaches whence the fuel will be ingested along with the air. Controlling the fuel supply cylically is also a means of controlling the force applied to the aircraft and hence controlling its flight path. If two or more jet engines are used it is also a means of keeping them synchronized, although a solid connection may be used. The engine may be started by a rocket booster in the usual way and may also contain auxiliary boosters for restart in case of failure. Forward propulsion, auxiliary power, and power for control jets, etc., can come from turbojet engine mounted on the body proper 1, or other propulsion systems may be used.

For the production of a sweeping shock wing the jet engine may be replaced by a mechanically driven element, or the piston 20 of a free piston engine shaped as shown in FIG. 12. Here the piston 20 also flies along a rail 21 which terminates in a concentric cylinder 22 with sides that are a close fit to the piston so that the shock wave from the nose of the piston seals the cylinder when the piston enters it. This seal is also strengthened by the resistance the leakage air finds from the close fitting surfaces. The area between the piston and the rail is sealed the same way.

When the piston enters the cylinder a high pressure builds up inside the cylinder causing the piston to come to rest. Into this high pressure, high temperature air fuel is injected through nozzle 23 at the appropriate time by suitable means. The fuel oxidizes and accelerates the piston out along the rail in the opposite direction where the process is repeated in a similar cylinder on the other end of the rail 21 (not shown). As the piston leaves the cylinder 22 the expansion wave causes the burnt gases in the cylinder to be scavenged and thus the air in the cylinder is ready for the return of the piston to start the cycle over again. To avoid excessive vibration another cylinder system may be placed back to back with the one shown and the piston reversals counterbalance each other. Or a nozzle 24 may be included in the cylinder as shown to counterbalance in the same manner as a recoilless rifle. The piston may be given its initial motion by an explosive charge injected into one of the cylinders and it may also be restarted in case of misfire by the same means when it has coasted or been blown into one of the cylinders.

Of course ramjet engines may be included in the piston to operate as previously described except that they would be used intermittently as the direction of the piston reversed. Their exhaust orifice would come out the side of the piston so that they would be sealed off by the cylinder walls at the appropriate time.

An annular duct may be placed around the outside of the aircraft of FIG. 1 so that the jet and shock wings may operate in a fashion similar to a ducted propeller.

Jet wings may also be formed and swept from a source that is fixed rigidly on the airframe. These may also operate in a duct. FIG. 13 and FIG. 14 show the side and top view respectively of a delta wing aircraft 25 equipped with four engines 26. In high speed forward flight it flies as a conventional aircraft. For hovering and transitional flight the jet exhaust from each engine is diverted downward and inward by some means 27 (to be discussed later) into four pairs of jet wings which sweep back and forth more or less along the arrows 12. The initial path of this sweep may follow any curve in space and have varying speeds along any portion of the curve because there are no structural limitations for jet wings as there are for rigid wings. Examples of such motions are shown in FIGS. 15, 16, 17, 18 where arrows 11 show direction of sweep and 12 show the sweep path. Initial jet wing cross-sections as described in FIGS. 3, 6, 7, 8, 9 may be used. Again the angle of attack of these cross-sections may be varied with time and we exploit the non-steady inertial effects as well as providing the optimum angle for each position of the sweep.

For all these jet wings the result is the same, namely that additional air is pumped under the aircraft 25 resulting in a higher pressure below it than exists on top of it thus sustaining the aircraft. It can also be maneuvered by applying pressure differentially across it so that a component of the resultant force will move the aircraft in the desired direction.

The means employed to form and sweep the jet wings 9 of FIGS. 13 and 14 may be just a set of vanes inserted in the jet exhaust either after or during expansion which give a certain direction to the beam for each setting of the vanes. Certain of these vanes may then be driven about a pivot system by mechanical means and in conjunction with the fixed vanes the beam is caused to sweep. However, it is not necessary to use solid moving parts to produce this effect. For example FIG. 19 shows such a device. 28 is the exhaust nozzle from a source of high enthalpy air. 29 is the mid-section of a trough to which the jet adheres due to the Coanda effect when the splitter 30 is suitably inserted in the exhaust stream, or 29 is brought close enough to the jet nozzle for this purpose. However, the curvature of 29 is so sharp that the exhaust will not stick all the way around but separates at some point before the end 31. This separation point is governed by the growth of the boundary layer of the jet in contact with the trough. Now if one or more slits 32, 33 be inserted in the trough in such a way that the jet splits off a portion of its boundary layer, say into slits 32, then the separation point moves further toward the endpoint 31. The same thing occurs if the jet reaches slit 33. If the slits are now connected to cavities 34 and 35 respectively then the pressures in these cavities control the flows through the slits.

If the pressure in 34 or 35 is high enough the flow will reverse direction and another much smaller jet will form and travel up the trough toward the nozzle 28. At some point it will meet the boundary layer of the main jet 9 and separate it. Since the main jet is so much larger the direction it takes at separation will be more or less tangent to the surface of the trough at the separation point. It follows therefore that the jet can be made to sweep back and forth in an arc as the separation point moves back and forth on the trough. This occurs if the pressures in a suitable number of properly spaced cavities like 34 and 35 are used in conjunction with the proper curvature of the Coanda trough.

These cavities are in effect Helmholtz resonators. They may be connected together and to other such resonators 36 by suitable nozzles 37, 38 and 39. Thus the frequency and phase of the pressure oscillations may be suitably controlled to produce the desired sweep. For maneuver, synchronization, etc., external ducts may be connected for example through 40 and the cavity 36 may be turned mechanically by a plunger 41. Extra power to sustain the oscillations may be brought in through 40 or another such connection from a master oscillator run with conventional fluid amplifier techniques. Or all the power needed to sustain oscillations can be bled off the main jet through the slits 32 and 33.

Of course more than one chain of slits may be used and suitably connected together to produce asymmetric or non-linear sweeps. And slits facing the other way may be used also to give greater control over the separating counter flowing jet. One cavity may also serve more than one Coanda trough and this is a good way of keeping two counterbalanced jet wings synchronized. To produce optimum sweep two or more troughs may be interconnected by nozzles and cavities. One trough may be fed by parallel jet sources to minimize danger of engine failure.

The trough may now turn through three dimensions if suitable vanes, walls and partial enclosures are used. FIG. 20 shows half of such a bending, twisting trough with 42 as the turning vanes and 43 as one wall. Any sweep can be produced by suitably shaping this Coanda trough. An airfoil shape can also be produced by cascading these troughs whose cross-sections 29 are shown in FIG. 21. Along with this it is possible to use various outlines of the slits 32, 33 so as to produce the proper jet wing cross-section and its spanwise change or divergence. By controlling the phases between the various troughs or between lateral slits on one trough, the proper angle of attack of the jet wing can be maintained.

The vibrating component of the direct thrust acting on the jet source and the Coanda trough may be counterbalanced by vanes suitably positioned along the trough so as to pick off a portion of the jet exhaust at each station along the trough and direct it in proper fashion. These work in conjunction with suitable modulation of the direct thrust from the engine perhaps by varying the afterburner fuel. Of course more than two jet wings may originate from one source and this would ease the counterbalancing and vibration problem.

The series of troughs may be trimmed as a whole unit by suitable means to various angles for the most advantageous operation. For example flight in the ground effect region will give an additional gain and so the jet path may be turned further outward to keep the underside of the aircraft from becoming too hot. This trimming function may also be accomplished with fluid amplifier techniques if desired whereby an additional component of momentum in the desired direction is given to the beam as it leaves the Coanda trough.

The entire trough may be retracted into the wing or a pod in much the same way that conventional landing gear is retracted. When extended the trough is locked in position before the splitter is inserted in the jet stream to deflect the beam into the trough. For warming up the engine a bleed may be provided on the Helmholtz resonators so that the twin beams would propagate to their last position of the trough. Then the engine is run up to power. In this way very little thrust is transmitted to the aircraft and this completely avoids the need for heavy landing gear. In this position the hot exhaust will run out along the ground and not heat up the rest of the aircraft. When everything is operating satisfactorily the pilot closes the bleed and the beams begin their sweep in perfect synchronization thus lifting the aircraft vertically off the ground.

When a sufficient height has been obtained the starboard 30 port 44 pairs of splitters FIG. 21 of each engine may be moved apart thus directing some of the thrust straight back and the plane begins to move forward. As it gains speed less and less power is needed in the jet wings to sustain the craft as its conventional lifting wing comes into play. Eventually the splitters leave the beam entirely and the Coanda troughs are retracted leaving the aircraft free to perform efficiently at high speed. To land this procedure is reversed.

Meanwhile suitable adjustments are made to keep the sweeps of the proper frequency and shape for each regime of flight. Also differential control applied between sweeps serves to maneuver the aircraft through its transition from landing position to high speed flight.

Although but a few embodiments of the present invention have been illustrated and described it will be apparent to those skilled in the art that various changes and modifications may be made therein without departing from the spirit of the invention or from the scope of the appended claims.

It is claimed and desired to secure by Letters Patent:

1. An aircraft comprising a body and a captive missile constrained to fly along said body and, means to propagate the exhaust of said missile as a jet propeller blade.

2. The method of propelling a fluid transversely to and by means of a gas jet within said fluid, independently of any propulsion generated by the structure per se from which the jet might be ejected, comprising: pressurizing a gas, venting said gas as a jet into said fluid, and moving said jet transversely to its vented direction.

References Cited by the Examiner

UNITED STATES PATENTS

| | | | |
|---|---|---|---|
| 2,871,954 | 2/59 | Dix | 170—135.4 |
| 2,875,578 | 3/59 | Kadosch | 60—35.54 |
| 2,943,821 | 7/60 | Wetherbee | 244—52 |
| 2,996,266 | 8/61 | Rebasti | 244—12 |
| 3,016,213 | 1/62 | Griswold | 244—42.41 |
| 3,068,642 | 12/62 | Schmidt | 60—35.5 |

FOREIGN PATENTS

| | | |
|---|---|---|
| 894,992 | 3/44 | France. |
| 148,328 | 7/31 | Switzerland. |

FERGUS S. MIDDLETON, *Primary Examiner.*

MILTON BUCHLER, R. DAVID BLAKESLEE,
*Examiners.*